United States Patent
Shido et al.

(10) Patent No.: US 10,823,354 B2
(45) Date of Patent: Nov. 3, 2020

(54) VEHICLE LAMP

(71) Applicant: KOITO MANUFACTURING CO., LTD., Tokyo (JP)

(72) Inventors: Masaya Shido, Shizuoka (JP); Toru Ito, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/614,004

(22) PCT Filed: May 15, 2018

(86) PCT No.: PCT/JP2018/018682
§ 371 (c)(1),
(2) Date: Nov. 15, 2019

(87) PCT Pub. No.: WO2018/216547
PCT Pub. Date: Nov. 29, 2018

(65) Prior Publication Data
US 2020/0072429 A1   Mar. 5, 2020

(30) Foreign Application Priority Data

May 23, 2017 (JP) ................................. 2017-101471

(51) Int. Cl.
| | | |
|---|---|---|
| *F21S 41/155* | (2018.01) | |
| *F21S 43/145* | (2018.01) | |
| *F21S 43/31* | (2018.01) | |
| *F21S 41/36* | (2018.01) | |
| *F21S 41/32* | (2018.01) | |
| *F21S 41/20* | (2018.01) | |

(Continued)

(52) U.S. Cl.
CPC ............ *F21S 41/155* (2018.01); *F21S 41/285* (2018.01); *F21S 41/321* (2018.01); *F21S 41/36* (2018.01); *F21S 43/145* (2018.01); *F21S 43/26* (2018.01); *F21S 43/31* (2018.01); *F21W 2103/10* (2018.01); *F21W 2103/20* (2018.01); *F21W 2103/35* (2018.01); *F21W 2103/55* (2018.01); *F21Y 2115/20* (2016.08)

(58) Field of Classification Search
CPC ........ F21S 41/155; F21S 41/36; F21S 41/321; F21S 43/145; F21S 43/31; F21S 43/26
See application file for complete search history.

(56) References Cited

U.S. PATENT DOCUMENTS 5,711,592 A    1/1998  Hotta

FOREIGN PATENT DOCUMENTS

| JP | H08-124408 A | 5/1996 |
|---|---|---|
| JP | 2000-040412 A | 2/2000 |

(Continued)

OTHER PUBLICATIONS

International Search Report dated Aug. 7, 2018 issued in PCT/JP2018/018682.

*Primary Examiner* — Anabel Ton
(74) *Attorney, Agent, or Firm* — Pearne & Gordon LLP

(57) ABSTRACT

A vehicle lamp that ensures achieving downsizing while integrating sensors and improving a designability is provided. The vehicle lamp includes a lamp function unit (10) and a sensor function unit (20). The lamp function unit (10) has a light irradiating region (30). The sensor function unit (20) is arranged within the light irradiating region (30) in a front view.

5 Claims, 7 Drawing Sheets

(51) Int. Cl.
*F21S 43/20* (2018.01)
*F21Y 115/20* (2016.01)
*F21W 103/10* (2018.01)
*F21W 103/35* (2018.01)
*F21W 103/20* (2018.01)
*F21W 103/55* (2018.01)

(56) References Cited

FOREIGN PATENT DOCUMENTS

| | | | | |
|---|---|---|---|---|
| JP | 2013-159200 A | 8/2013 | | |
| JP | 2015-080963 A | 4/2015 | | |
| JP | 2017-007356 A | 1/2017 | | |
| WO | WO-2015072133 A1 * | 5/2015 | ............ | F21S 43/239 |

* cited by examiner (a)

(b)

(a)

110

(b)

B–B (a)

(b)

(a)

120

(b)

C-C

140

150

VEHICLE LAMP

TECHNICAL FIELD

The present invention relates to a vehicle lamp, in particular, relates to a vehicle lamp having a sensor function.

BACKGROUND ART

As a vehicle lamp in recent years, there has been proposed a vehicle lamp in which various functions, such as a headlamp, a daytime running lamp, and a turn signal, are integrated, and a size of a whole lamp tends to be increased to a large-size. There has also been a desire to integrate sensors, such as a camera and a Light Detection and Ranging (LIDAR), into a vehicle lamp, in order to obtain various kinds of information to assist in driving a vehicle.

PATENT LITERATURE 1 discloses a vehicle lamp in which various kinds of lamps and sensors are integrated. PATENT LITERATURE 1 houses a plurality of lamp units and cameras within a housing, and an extension is provided between the lamp unit and the camera to separate and dispose the lamp unit and the camera from one another.

CITATION LIST

Patent Literature

PATENT LITERATURE 1: JP-A-2013-159200

SUMMARY OF THE INVENTION

Problems to Be Solved by the Invention

In order to improve fuel efficiency and aerodynamic characteristics of a vehicle, it is preferred to downsize, thin, and narrow a vehicle lamp. However, since the vehicle lamp in PATENT LITERATURE 1 disposes the plurality of lamp units and cameras in parallel, a lamp size is further increased, thereby making it difficult to achieve downsizing, thinning, and narrowing. When the sensors are disposed inside the vehicle lamp, a region where the sensors are disposed is visually perceived from an outside as a non-light-emitting region, thereby causing a problem of a poor designability.

Therefore, the present invention has been made in view of the above-described conventional problems, and it is an object of the present invention to provide a vehicle lamp that ensures achieving downsizing while integrating sensors, and improving a designability.

Solution to the Problems

To solve the above-described problem, a vehicle lamp according to the present invention includes a lamp function unit and a sensor function unit, herein the lamp function unit has a light irradiating region, and the sensor function unit is arranged within the light irradiating region in a front view.

With such a vehicle lamp according to the present invention, since the sensor function unit is disposed in the light irradiating region of the lamp function unit, the vehicle lamp can be downsized, and since the sensor function unit is difficult to be visually perceived when the lamp function unit emits a light, a designability also improves.

An aspect according to the present invention, in front of the sensor function unit, a transmission window portion that transmits a light is disposed in the light irradiating region.

Another aspect according to the present invention, the light irradiating region is configured of an organic EL device.

Still another aspect according to the present invention, the light irradiating region is configured of a light source unit and a reflecting mirror that reflects a light from the light source unit.

Still another aspect according to the present invention, the light irradiating region is configured of a light source unit and a light guiding member, and a scattering portion that scatters a light from the light source unit is formed on the light guiding member.

Still another aspect according to the present invention, a second lamp function unit, wherein the second lamp function unit is arranged within the light irradiating region in a front view.

Effects of the Invention

The present invention ensures providing a vehicle lamp that ensures achieving downsizing while integrating sensors, and improving a designability.

BRIEF DESCRIPTION OF THE DRAWINGS

FIG. 1(a) is a schematic perspective view, and FIG. 1(b) is a cross-sectional view taken along the line A-A in FIG. 1(a).

FIG. 2(a) is an example using a reflective plate 31, and FIG. 2(b) is an example using the reflective plate 31 and a transparent organic EL device 40c.

FIG. 3(a) is a schematic perspective view, and FIG. 3(b) is a cross-sectional view taken along the line B-B in FIG. 3(a).

FIG. 4(a) is an example using scattering portions 52a, 52b, and FIG. 4(b) is an example using diffusion plates 53a, 53b.

FIG. 5(a) is a schematic perspective view, and FIG. 5(b) is a cross-sectional view taken along the line C-C in FIG. 5(a).

DESCRIPTION OF THE EMBODIMENTS

First Embodiment

Figure 1:
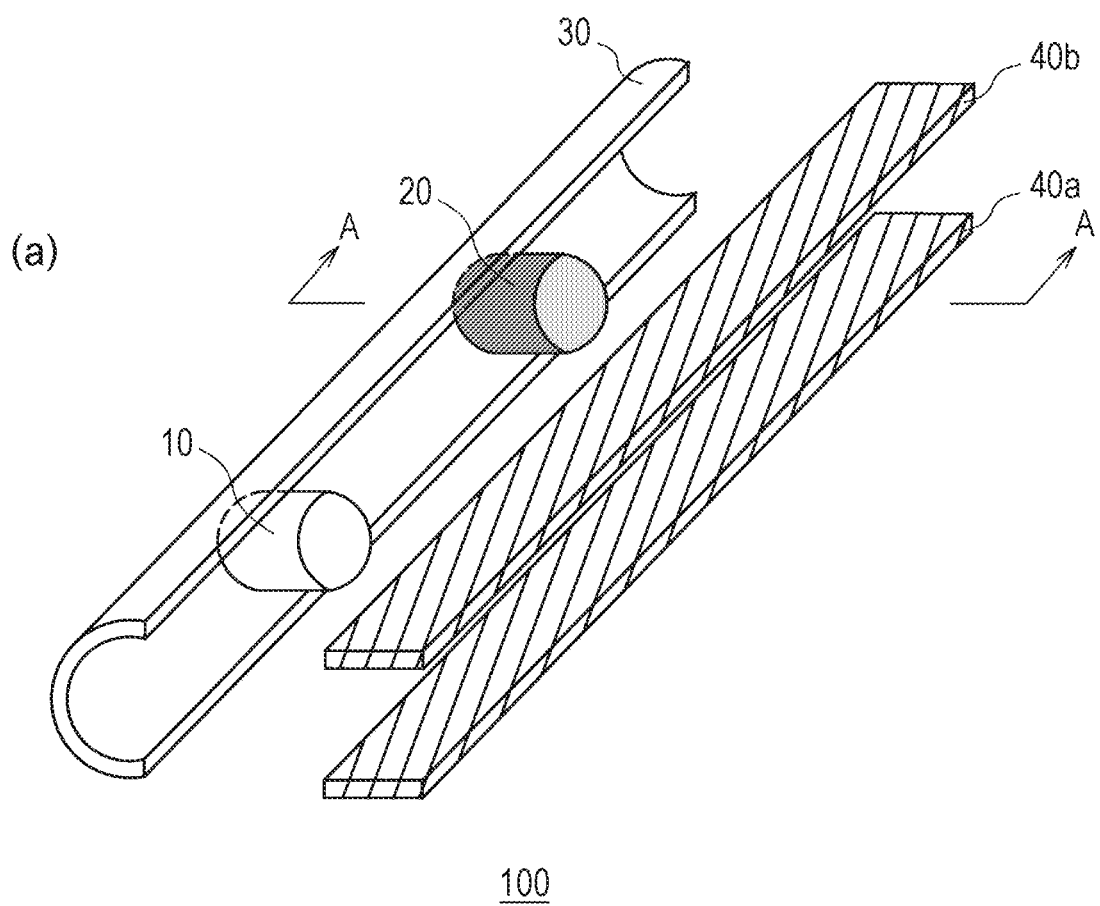
FIG. 1 is a schematic diagram illustrating a vehicle lamp 100 according to a first embodiment.
Figure 1:
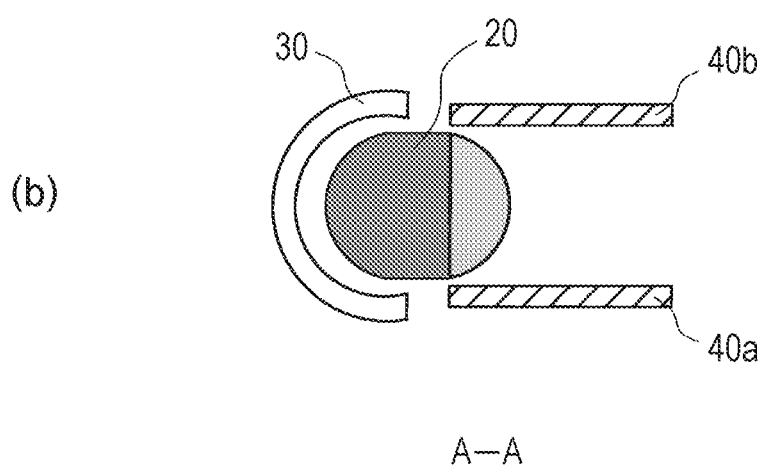

The following describes embodiments of the present invention in details with reference to the drawings. Identical or equivalent components, members, and treatments illustrated in each drawing are attached by identical reference numerals, and repeated explanation is appropriately omitted. FIG. 1 is a schematic diagram illustrating a vehicle lamp 100 according to an embodiment, FIG. 1(a) is a schematic perspective view, and FIG. 1(b) is a cross-sectional view taken along the line A-A in FIG. 1(a). The vehicle lamp 100 includes a lamp 10, a sensor 20, a reflecting mirror 30, and organic EL devices 40a, 40b. The respective parts are housed within a housing (not illustrated) and are integrated. In this embodiment, the organic EL devices 40a, 40b and the reflecting mirror 30 configure a lamp function unit and a light irradiating region according to the present invention.

The lamp 10 is a member that irradiates a front with a light, and corresponds to a second lamp function unit according to the present invention. Here, the front is a direction in which the vehicle lamp 100 is disposed to irradiate with the light. When the vehicle lamp 100 is a front lamp, it indicates a front of a vehicle, and when the vehicle lamp 100 is a rear lamp, it indicates a rear of the vehicle. A light source of the lamp 10 is not limited, and may be any one of a halogen lamp, a Light Emitting Diode (LED) lamp, a High-Intensity Discharge (HID) lamp, and the like. The lamp 10 achieves various kinds of lamp functions by being supplied with an electric power and a signal by a wiring (not illustrated) from an outside, and irradiates a front of the vehicle lamp 100 with a predetermined light.

When the vehicle lamp 100 is a front lamp, the vehicle lamp 100 may achieve various kinds of lamp functions, such as a headlamp, a turn-signal lamp, and a daytime running lamp. When the vehicle lamp 100 is a rear lamp, the vehicle lamp 100 may achieve various kinds of lamp functions, such as a stop lamp, a tail lamp, and a turn-signal lamp. While FIG. 1 illustrates the example in which only one lamp 10 is disposed, a plurality of the lamps 10 that achieve an identical function may be disposed, or the plurality of lamps 10 may be disposed to achieve different functions.

The sensor 20 is a portion that includes sensors that measure an external environment of the vehicle lamp 100. Functions included in the sensor 20 include a camera that includes an imaging device, such as a Charge Coupled Device (CCD) and a Complementary MOS (CMOS), and LIDAR and the like that measure a distance by including a laser device, and they correspond the sensor function unit according to the present invention.

The sensor 20 is coupled with the wiring from the outside of the vehicle lamp 100. When the electric power is supplied, various kinds of sensor functions operate to execute a measurement of the external environment, and its measurement result is transmitted to a control device mounted on the vehicle via the wiring. While FIG. 1 illustrates the example in which only one sensor 20 is included, a plurality of the sensors 20 that achieves an identical function may be included or the plurality of sensors 20 may be included to achieve different functions.

The reflecting mirror 30 is a member disposed at a rear of the lamp 10, the sensor 20, and the organic EL devices 40a, 40b, and has a reflecting surface that reflects the light. The reflecting mirror 30 forms a light irradiating region of the present invention. In the reflecting surface of the reflecting mirror 30, the lamp 10 and the sensor 20 are disposed. In a front view from the front of the vehicle lamp 100, the lamp 10 and the sensor 20 are positioned within a region of the reflecting mirror 30. While in the example illustrated in FIG. 1, a semi-cylinder shaped one is illustrated as the reflecting mirror 30, and the light irradiating region is illustrated in a rectangular shape, any shape may be employed.

The organic EL devices 40a, 40b are members that emit predetermined lights by being supplied with the electric power by the wiring (not illustrated), and correspond to a light source unit according to the present invention. As illustrated in FIG. 1, the organic EL devices 40a, 40b are flat plate shaped members, and are disposed in approximately parallel above and under the lamp 10 and the sensor 20 in front of the reflecting mirror 30. The lights emitted by the organic EL device 40a and the organic EL device 40b may have the same colors, or may emit mutually different colored lights. The organic EL devices 40a, 40b may be in curved surface shapes instead of the flat plate shapes, and may have a flexibility.

The lights emitted from the organic EL devices 40a, 40b are irradiated on the front of the vehicle lamp 100 and are also irradiated toward the lamp 10, the sensor 20, and the reflecting mirror 30. The light irradiated toward the reflecting mirror 30 is reflected by the reflecting mirror 30 to be irradiated on the front of the vehicle lamp 100. Accordingly, the organic EL devices 40a, 40b and the reflecting mirror 30 configure the lamp function unit and the light irradiating region according to the present invention. Since the organic EL devices 40a, 40b and the reflecting mirror 30 configure the lamp function unit and the light irradiating region of the present invention, only the sensor 20 may be arranged within the region of the reflecting mirror 30 without arranging the lamp 10.

In the vehicle lamp 100 according to this embodiment, when the organic EL devices 40a, 40b emit the lights, the lamp 10, the sensor 20, and the reflecting mirror 30 are irradiated with the lights from the organic EL devices 40a, 40b, and the lights are reflected by respective surfaces of the lamp 10, the sensor 20, and the reflecting mirror 30. Accordingly, the sensor 20 is disposed inside the light irradiating region, and it is visually perceived as if the whole vehicle lamp 100 including the sensor 20 emits the light. This causes the sensor 20 to be visually perceived as a light emitting region from the outside even though the sensor 20 is a non-light-emitting element, thereby ensuring an improved designability. Downsizing and thinning of the vehicle lamp 100 can also be achieved. Since there is no member that obstructs the front of the lamp 10 and the sensor 20, the incidence and emission of the light is not interfered between the lamp 10 and sensor 20 and the outside, thereby ensuring proper light irradiation and external environment measurement.

In particular, when the vehicle lamp 100 is used as the daytime running lamp or the tail lamp, the organic EL devices 40a, 40b as the light source unit emit the lights even in a day time, and the lights are constantly reflected by the whole reflecting mirror 30, to cause the sensor 20 to be difficult to be visually perceived from the outside, thereby ensuring a further enhanced designability.

Modification of First Embodiment

Figure 2:
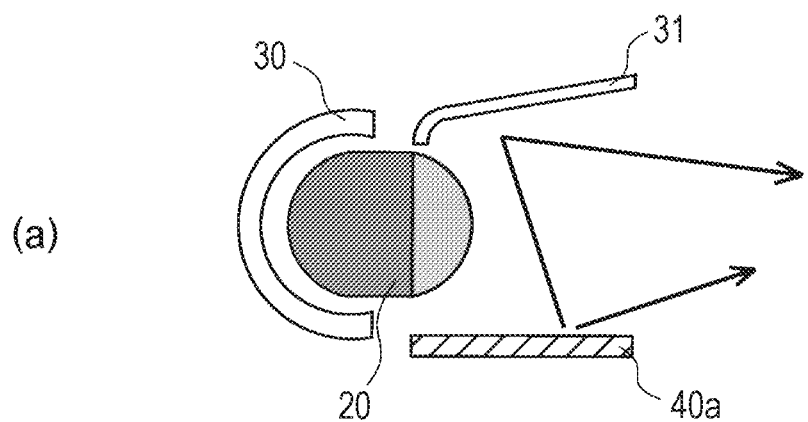
FIG. 2 is a schematic diagram illustrating a modification of the first embodiment.
Figure 2:
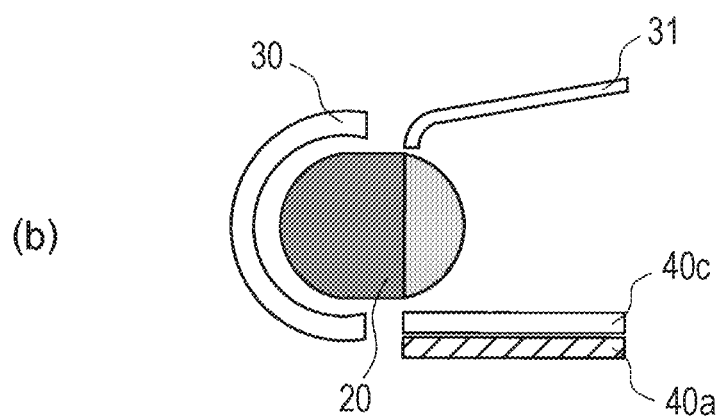

FIG. 2 is a schematic diagram illustrating a modification of the first embodiment, FIG. 2(a) is an example using a reflective plate 31, and FIG. 2(b) is an example using the reflective plate 31 and a transparent organic EL device 40c. In the modification illustrated in FIG. 2(a), only the organic EL device 40a is used as the light source unit, and the reflective plate 31 is used instead of the organic EL device 40b.

The reflective plate 31 is disposed along a longitudinal direction of the reflecting mirror 30 in the front and an upper side of the reflecting mirror 30, and is a member having a reflecting surface that reflects the light. While FIGS. 2(a) and 2(b) illustrate an approximately flat plate shaped one as the reflective plate 31, the reflecting surface may be in a curved surface shape.

In this modification, the light emitted from the organic EL device 40a is irradiated on the front of the vehicle lamp 100, and is irradiated toward the lamp 10, the sensor 20, the reflecting mirror 30, and the reflective plate 31. The light irradiated toward the reflecting mirror 30 is reflected by the reflecting mirror 30 to be irradiated on the front of the vehicle lamp 100. The light irradiated toward the reflective plate 31 is reflected by the reflective plate 31 to be irradiated on the front of the vehicle lamp 100. Accordingly, the organic EL device 40a, the reflecting mirror 30, and the reflective plate 31 configure the lamp function unit and the light irradiating region according to the present invention.

Also in this modification, the sensor 20 is visually perceived as the light emitting region from the outside even though the sensor 20 is the non-light-emitting, element, thereby ensuring the improved designability. Downsizing and thinning of the vehicle lamp 100 can also be achieved.

In the modification illustrated in FIG. 2(b), the organic EL device 40a and the transparent organic EL device 40c are used as the light source unit, and the reflective plate 31 is used instead of the organic EL device 40b. The transparent organic EL device 40c emits a predetermined light by being supplied with the electric power by the wiring (not illustrated), and is a member configured of a material that transmits a visible light. As illustrated in FIG. 2(b), the transparent organic EL device 40c is disposed between the organic EL device 40a and the reflective plate 31, and the organic EL device 40a and the transparent organic EL device 40c correspond to the light source unit according to the present invention. The lights emitted by the organic EL device 40a and the transparent organic EL device 40c may have the same colors, or may emit mutually different colored lights.

In this modification, the light emitted from the organic EL device 40a transmits through the transparent organic EL device 40c, and the light is irradiated on the front of the vehicle lamp 100, and is irradiated toward the lamp 10, the sensor 20, the reflecting mirror 30, and the reflective plate 31. Similarly, the light emitted from the transparent organic EL device 40c also is irradiated on the front of the vehicle lamp 100, and is irradiated toward the lamp 10, the sensor 20, the reflecting mirror 30, and the reflective plate 31. The light irradiated toward the reflecting mirror 30 is reflected by the reflecting mirror 30 to be irradiated on the front of the vehicle lamp 100. The light irradiated toward the reflective plate 31 is reflected by the reflective plate 31 to be irradiated on the front of the vehicle lamp 100. Accordingly, the organic EL device 40a, the transparent organic EL device 40c, the reflecting mirror 30, and the reflective plate 31 configure the lamp function unit and the light irradiating region according to the present invention.

Also in this modification, the sensor 20 is visually perceived as the light emitting region from the outside even though the sensor 20 is the non-light-emitting element, thereby ensuring the improved designability. Downsizing and thinning of the vehicle lamp 100 can also be achieved.

Second Embodiment

Figure 3:
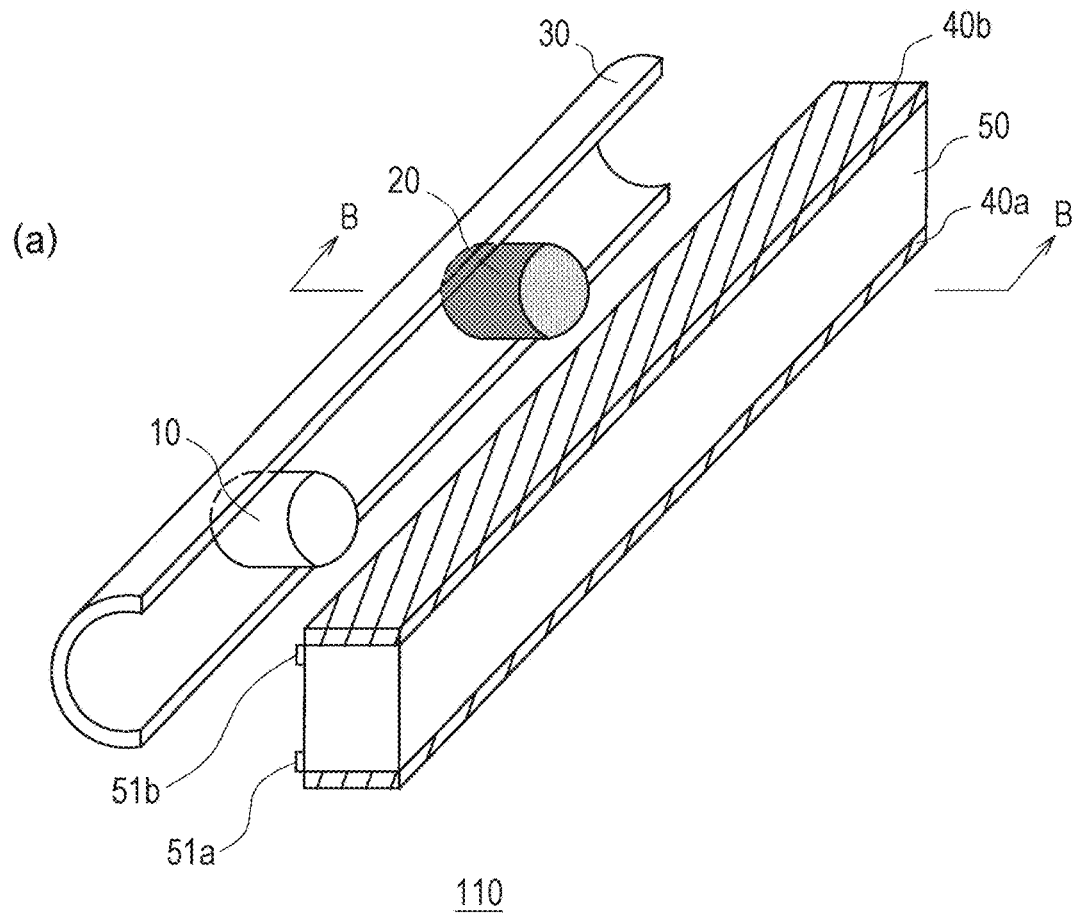
FIG. 3 is a schematic diagram illustrating a vehicle lamp 110 according to a second embodiment.
Figure 3:
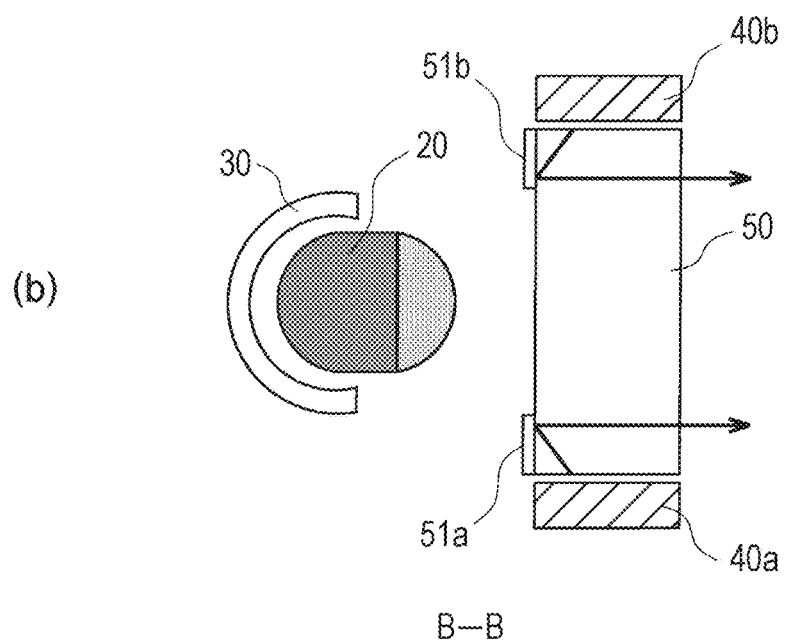

Next, a second embodiment of the present invention will be described by referring to FIG. 3. Duplicate description of components corresponding to those of the first embodiment is omitted. FIG. 3 is a schematic diagram illustrating a vehicle lamp 110 according to this embodiment, FIG. 3(a) is a schematic perspective view, and FIG. 3(b) is a cross-sectional view taken along the line B-B in FIG. 3(a). The vehicle lamp 110 includes the lamp 10, the sensor 20, the reflecting mirror 30, the organic EL devices 40a, 40b, a light guiding member 50, and reflective plates 51a, 51b. The respective parts are housed within a housing (not illustrated) and are integrated.

The light guiding member 50 is an approximately rectangular parallelepiped shaped member configured of a material that transmits a light. The organic EL devices 40a, 40b are adjacently disposed on top and inferior surfaces of the light guiding member 50. A material that configures the light guiding member 50 is not limited, and a material that properly transmits a light, such as an acrylic resin, an epoxy resin, a polycarbonate resin, and a glass, can be used. While FIG. 3 illustrates the approximately rectangular parallelepiped shaped one as the light guiding member 50, the light guiding member 50 may be one with a curved surface in a cylindrical shape, a lens shape, and the like.

The reflective plates 51a, 51b are disposed in regions close to the organic EL devices 40a, 40b on a back surface of the light guiding member 50. The reflective plates 51a, 51b are members having reflecting surfaces that scatter and reflect lights, and correspond to a scattering portion according to the present invention. The reflective plates 51a, 51b may be formed into separate bodies from the light guiding member 50 and be attached on the back surface of the light guiding member 50, or reflecting surfaces may be formed on the back surface of the light guiding member 50 by plating, deposition, or the like.

While FIG. 3 illustrates the example in which the reflective plates 51a, 51b are separated and disposed on the back surface of the light guiding member 50, the reflective plates 51a, 51b may be formed across an approximately whole region of the back surface of the light guiding member 50, and only regions in front of the lamp 10 and the sensor 20 on the reflective plates 51a, 51b may be opened. The opening provided in front of the sensor 20 transmits an emission light from the sensor 20 to the outside and an incident light from the outside to the sensor 20, therefore, corresponds to a transmission window portion according to the present invention.

The lights emitted from the organic EL devices 40a, 40b propagate inside the light guiding member 50, and the lights are irradiated on a front of the vehicle lamp 110, and are irradiated on the lamp 10, the sensor 20, the reflecting mirror 30, and the reflective plates 51a, 51b. The light irradiated toward the reflective plates 51a, 51b is scattered and reflected to be irradiated on the front of the vehicle lamp 100. Accordingly, the organic EL devices 40a, 40b as the light source unit and the reflective plates 51a, 51b as the scattering portions configure the lamp function unit and the light irradiating region according to the present invention.

Since the regions where the reflective plates 51a, 51b as the scattering portions are disposed scatter the lights from the organic EL devices 40a, 40b, the regions are visually perceived as light irradiating regions from the outside. In the region where the reflective plates 51a, 51b as the scattering portions are not disposed, the incidence and emission of the light is not interfered between the lamp 10 and sensor 20 and the outside, thereby ensuring proper light irradiation and external environment measurement.

Even in this embodiment, the sensor 20 is disposed inside the light irradiating region, and it is visually perceived as if the whole vehicle lamp 110 including the sensor 20 emits the light. This causes the sensor 20 to be visually perceived as the light emitting region from the outside even though the sensor 20 is the non-light-emitting element, thereby ensuring the improved designability. Downsizing and thinning of the vehicle lamp 110 can also be achieved. While the example in which the reflective plates 51a, 51b are scattering reflecting surfaces is illustrated, the reflection by the reflective plates 51a, 51b may be a specular reflection.

Modification of Second Embodiment

Figure 4:
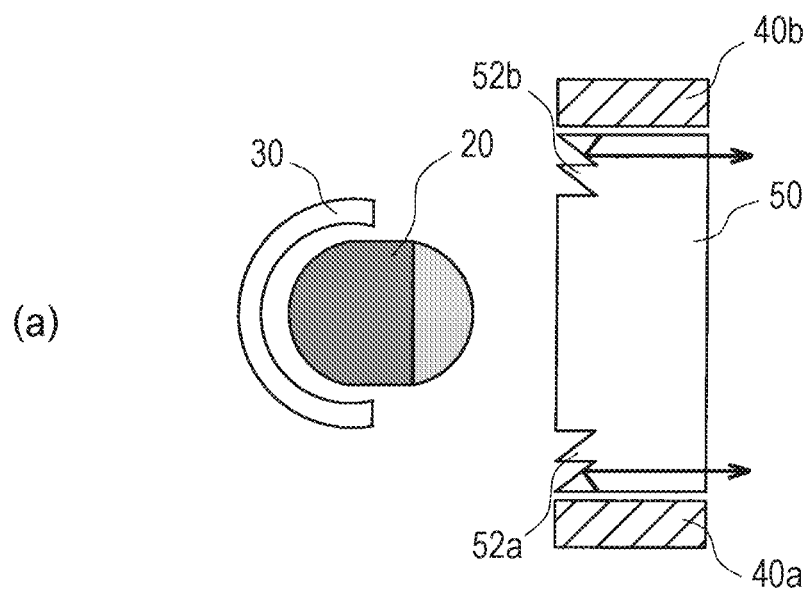
FIG. 4 is a schematic diagram illustrating a modification of the second embodiment.
Figure 4:
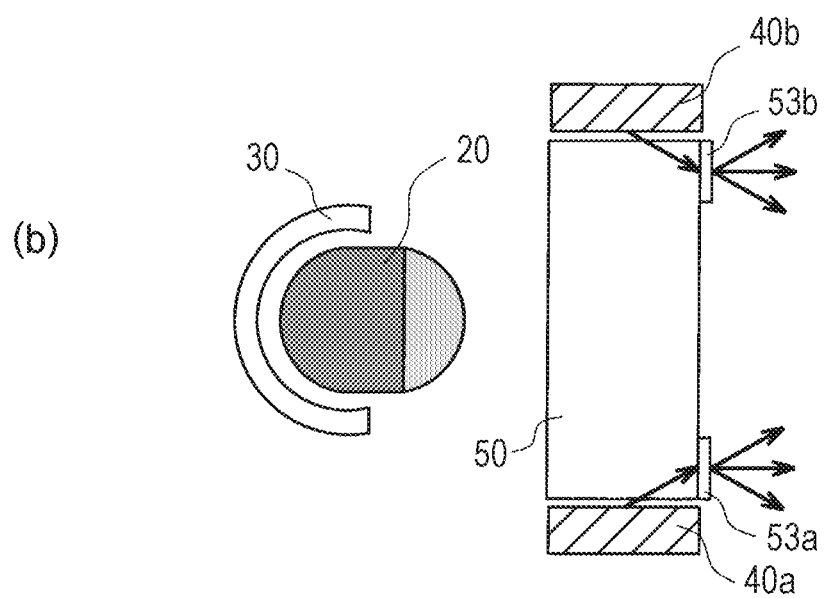

FIG. 4 is a schematic diagram illustrating a modification of the second embodiment, FIG. 4(a) is an example using scattering portions 52a, 52b, and FIG. 4(b) is an example using diffusion plates 53a, 53b. In the modification illustrated in FIG. 4(a), the scattering portions 52a, 52b in uneven shapes are formed on the back surface of the light guiding member 50 instead of the reflective plates 51a, 51b. In this modification, only the regions in front of the lamp 10 and the sensor 20 on the back surface of the light guiding member 50 are flat surfaces, and the whole other regions have the scattering portions 52a, 52b. In the back surface of the light guiding member 50, the region without the scattering portions 52a, 52b transmits an emission light from the sensor 20 to the outside and an incident light from the outside to the sensor 20, therefore, corresponds to the transmission window according to the present invention.

Even in this modification, the lights emitted from the organic EL devices 40a, 40b propagate inside the light guiding member 50, and the lights are irradiated on the front of the vehicle lamp 110, and are irradiated on the lamp 10, the sensor 20, the reflecting mirror 30, and the scattering portions 52a, 52b. The light irradiated toward the scattering portions 52a, 52b is scattered and reflected to be irradiated on the front of the vehicle lamp 110. Accordingly, the organic EL devices 40a, 40b as the light source unit and the scattering portions 52a, 52b configure the lamp function unit and the light irradiating region according to the present invention.

In the modification illustrated in FIG. 4(b), the diffusion plates 53a, 53b are formed on a front surface of the light guiding member 50 instead of the reflective plates 51a, 51b. The diffusion plates 53a, 53b are approximately plate shaped members that transmit and diffuse a light, and correspond to the scattering portions of the present invention. A structure of the diffusion plates 53a, 53b is not limited, and for example, a member formed by dispersing fine particles within a transparent resin can be used.

Even in this modification, the lights emitted from the organic EL devices 40a, 40b propagate inside the light guiding member 50, and the lights are irradiated on the front of the vehicle lamp 110, and are irradiated on the lamp 10, the sensor 20, the reflecting mirror 30, and the diffusion plates 53a, 53b. The light irradiated toward the diffusion plates 53a, 53b is scattered to be irradiated on the front of the vehicle lamp 110. Accordingly, the organic EL devices 40a, 40b as the light source unit and the diffusion plates 53a, 53b configure the lamp function unit and the light irradiating region according to the present invention.

Even in the modification illustrated in FIGS. 4(a) and 4(b), the sensor 20 is visually perceived as the light emitting region from the outside even though the sensor 20 is the non-light-emitting element, thereby ensuring the improved designability. Downsizing and thinning of the vehicle lamp 110 can also be achieved.

Third Embodiment

Figure 5:
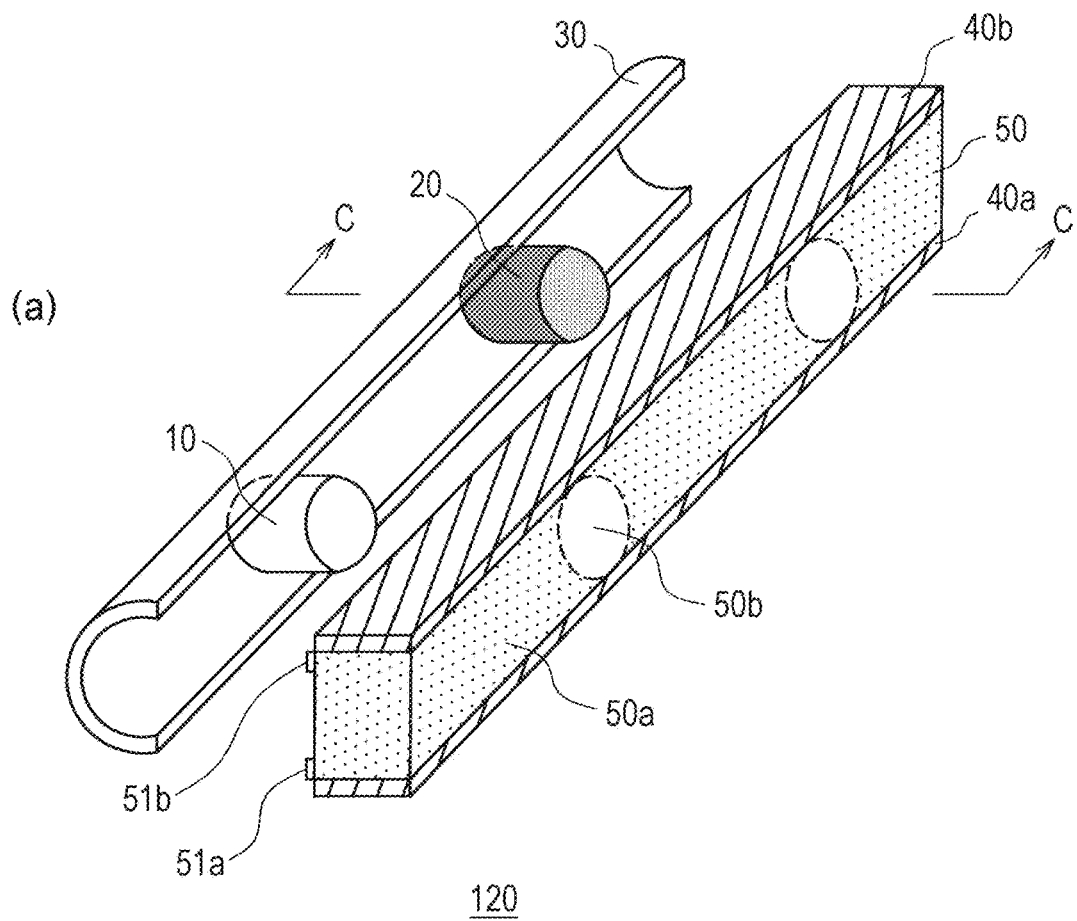
FIG. 5 is a schematic diagram illustrating a vehicle lamp 120 according to a third embodiment.
Figure 5:
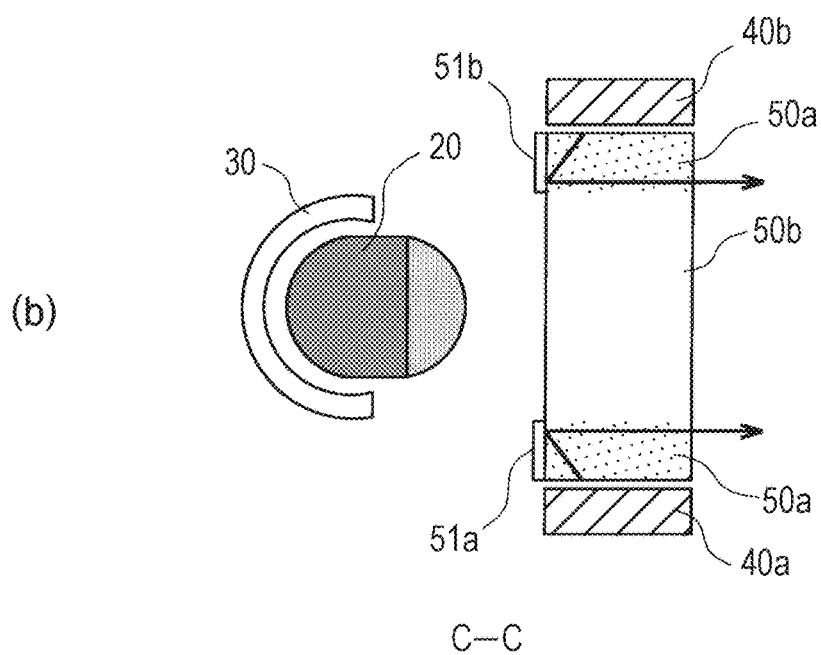

Next, a third embodiment of the present invention will be described by referring to FIG. 5. Duplicate description of components corresponding to those of the first embodiment is omitted. FIG. 5 is a schematic diagram illustrating a vehicle lamp 120 according to this embodiment, FIG. 5(a) is a schematic perspective view, and FIG. 5(b) is a cross-sectional view taken along the line C-C in FIG. 5(a). The vehicle lamp 120 includes the lamp 10, the sensor 20, the reflecting mirror 30, the organic EL devices 40a, 40b, the light guiding member 50, and the reflective plates 51a, 51b. The respective parts are housed within a housing (not illustrated) and are integrated.

The light guiding member 50 in this embodiment is configured of a material that transmits a light, and has scattering portions 50a that scatter the light with dispersed microparticles. In the light guiding member 50, the microparticles are not dispersed in the regions in front of the lamp 10 and the sensor 20, and transmission window portions 50b that transmit the light are configured.

The lights emitted from the organic EL devices 40a, 40b are propagated inside the light guiding member 50 and scattered with the scattering portions 50a, and a front of the vehicle lamp 120 is irradiated with the lights. Accordingly, the organic EL devices 40a, 40b as the light source unit, and the scattering portions 50a and transmission window portions 50b configure the lamp function unit and the light irradiating region according to the present invention.

The regions where the scattering portions 50a and the transmission window portions 50b are disposed are visually perceived as light irradiating regions from the outside since they scatter the lights from the organic EL devices 40a, 40b. In the regions where the scattering portions 50a and the transmission window portions 50b are not disposed, the incidence and emission of the light is not interfered between the lamp 10 and sensor 20 and the outside, thereby ensuring proper light irradiation and external environment measurement.

Even in this embodiment, the sensor 20 is disposed inside the light irradiating region, and it is visually perceived as if the whole vehicle lamp 120 including the sensor 20 emits the light. This causes the sensor 20 to be visually perceived as the light emitting region from the outside even though the sensor 20 is the non-light-emitting element, thereby ensuring the improved designability. Downsizing and thinning of the vehicle lamp 120 can also be achieved.

Fourth Embodiment

Figure 6:
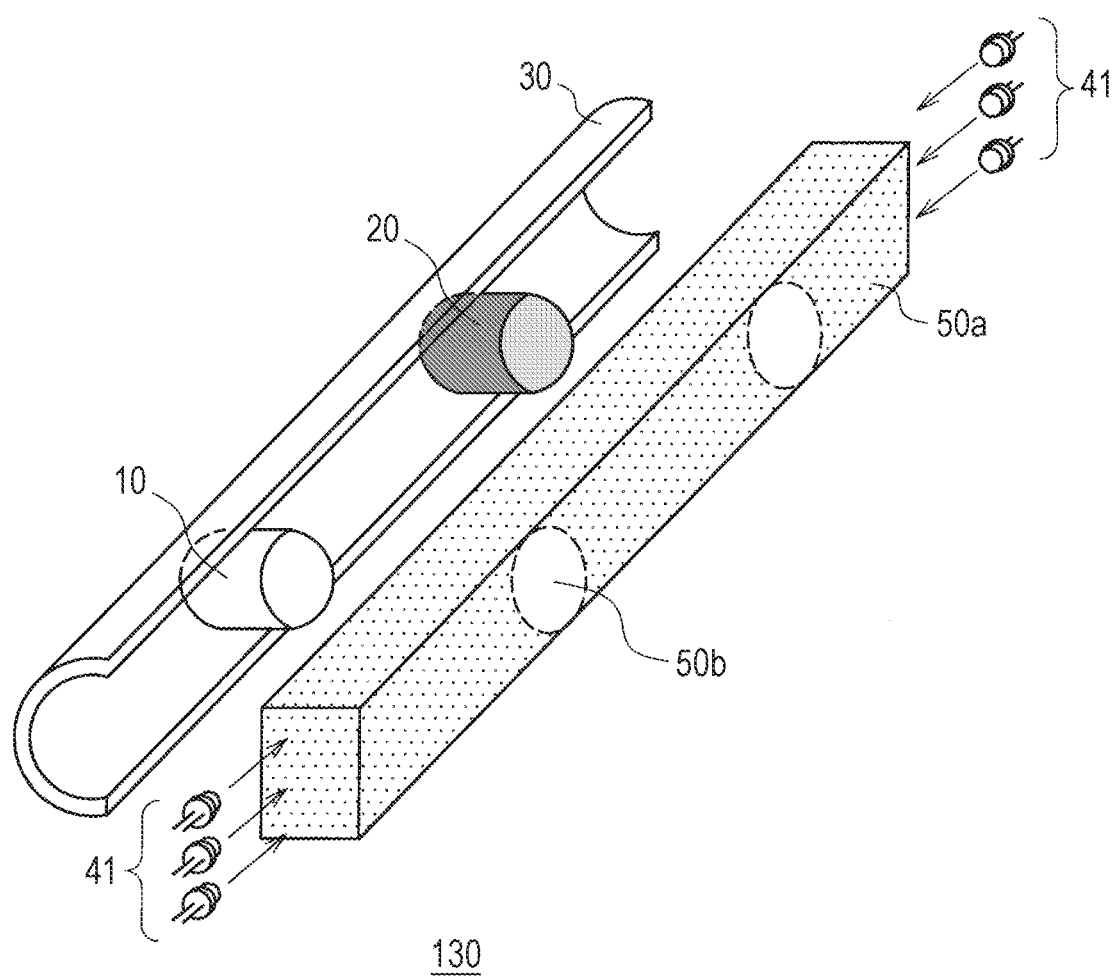
FIG. 6 is a schematic perspective view illustrating a vehicle lamp 130 according to a fourth embodiment.

Next, a fourth embodiment of the present invention will be described by referring to FIG. 6. Duplicate description of components corresponding to those of the first embodiment is omitted. FIG. 6 is a schematic diagram illustrating a vehicle lamp 130 according to this embodiment. The vehicle lamp 130 includes the lamp 10, the sensor 20, the reflecting mirror 30, a plurality of LEDs 41, and the light guiding member 50. The respective parts are housed within a housing (not illustrated) and are integrated. The light guiding member 50 of this embodiment is also configured of a material that transmits a light, and has the scattering portions 50a that scatter the light with the dispersed microparticles. In the light guiding member 50, the microparticles are not dispersed in the regions in front of the lamp 10 and the sensor 20, and the transmission window portions 50b that transmit the light are configured.

The LEDs 41 are members that emit predetermined lights by being supplied with the electric power by the wiring (not illustrated), and correspond to the light source unit according to the present invention. As illustrated in FIG. 6, the LEDs 41 are disposed to oppose side surfaces of the light guiding member 50, and cause the lights to enter the inside from the side surfaces of the light guiding member 50. The lights emitted by the plurality of LEDs 41 may have the same colors, or may emit mutually different colored lights.

The lights emitted from the LEDs 41 enter the light guiding member 50 from the side surfaces of the light guiding member 50, propagate inside the light guiding member 50, and are scattered in the scattering portions 50a. A front of the vehicle lamp 130 is irradiated by the lights. Accordingly, the LEDs 41 as the light source unit and the scattering portions 50a and transmission window portions 50b configure the lamp function unit and the light irradiating region according to the present invention.

Even in this embodiment, since the regions where the scattering portions 50a and the transmission window portions 50b are disposed scatter the lights from the organic EL devices 40a, 40b, the regions are visually perceived as light irradiation regions from the outside. In the regions where the scattering portions 50a and the transmission window portions 50b are not disposed, the incidence and emission of the light is not interfered between the lamp 10 and sensor 20 and the outside, thereby ensuring proper light irradiation and external environment measurement. This causes the sensor 20 to be visually perceived as the light emitting region from the outside even though the sensor 20 is the non-light-emitting element, thereby ensuring the improved designability. Downsizing and thinning of the vehicle lamp 130 can also be achieved.

Fifth Embodiment

Figure 7:
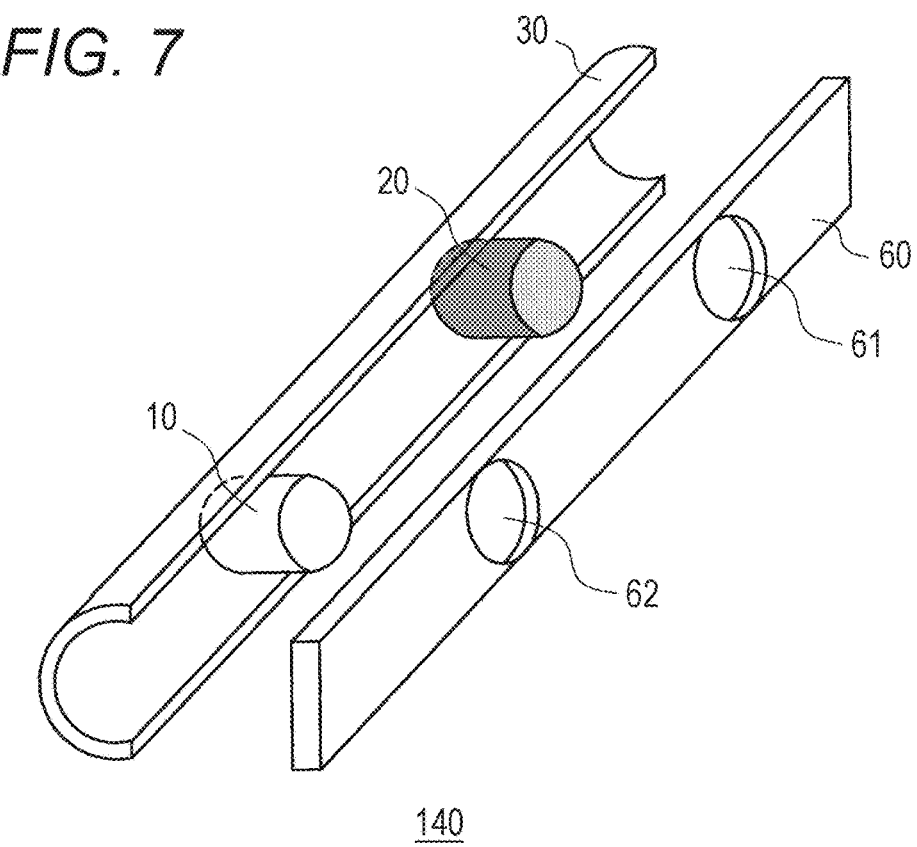
FIG. 7 is a schematic perspective view illustrating a vehicle lamp 140 according to a fifth embodiment.

Next, a fifth embodiment of the present invention will be described by referring to FIG. 1. Duplicate description of components corresponding to those of the first embodiment is omitted. FIG. 7 is a schematic diagram illustrating a vehicle lamp 140 according to this embodiment. The vehicle lamp 140 includes the lamp 10, the sensor 20, the reflecting mirror 30, and an organic EL device 60. The respective parts are housed within a housing (not illustrated) and are integrated.

As illustrated in FIG. 7, the organic EL device 60 is disposed so as to cover the reflecting mirror 30 in front of the lamp 10, the sensor 20, and the reflecting mirror 30. On the organic EL device 60, openings 61, 62 are formed in front of the sensor 20 and the lamp 10, respectively. The light emitted from the organic EL device 60 is irradiated on a front of the vehicle lamp 140. Accordingly, in this embodiment, the whole organic EL device 60 is the light irradiating region. The openings 61, 62 correspond to the transmission window portions.

In this embodiment, the organic EL device 60 is visually perceived as the light irradiating region. With the openings 61, 62, the incidence and emission of the light is not interfered between the lamp 10 and sensor 20 and the outside, thereby ensuring proper light irradiation and external environment measurement. This causes the sensor 20 to be visually perceived as the light emitting region from the outside even though the sensor 20 is the non-light-emitting element, thereby ensuring the improved designability. Downsizing and thinning of the vehicle lamp 140 can also be achieved.

Sixth Embodiment

Figure 8:
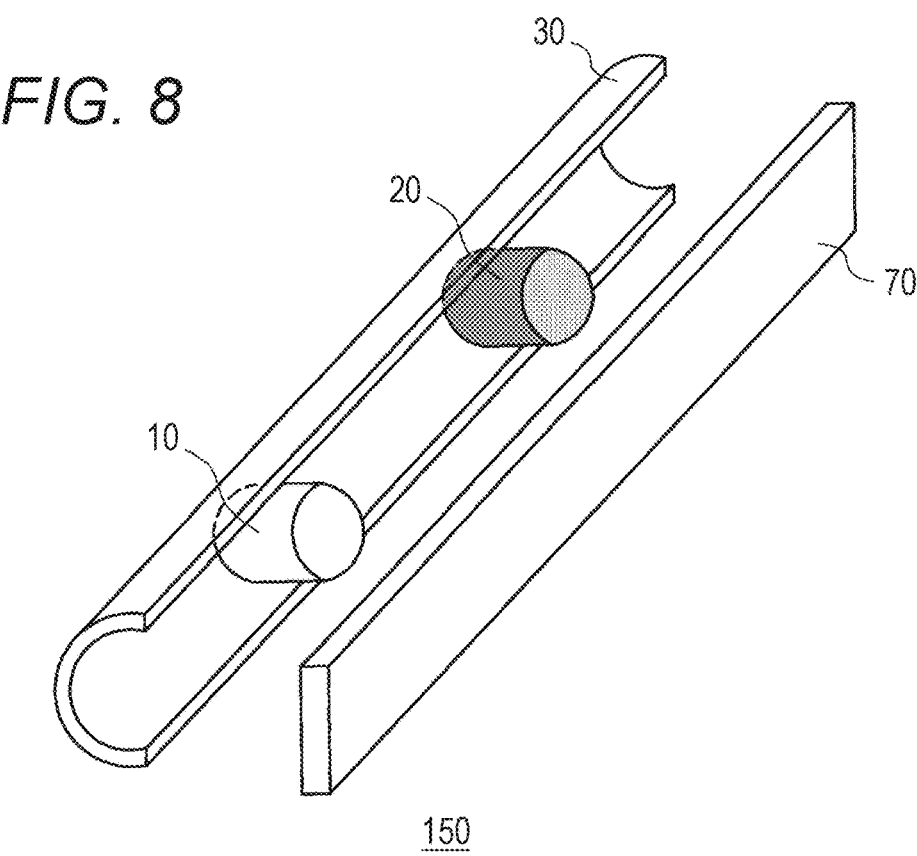
FIG. 8 is a schematic perspective view illustrating a vehicle lamp 150 according to a sixth embodiment.

Next, a sixth embodiment of the present invention will be described by referring to FIG. 8. Duplicate description of components corresponding to those of the first embodiment is omitted. FIG. 8 is a schematic diagram illustrating a vehicle lamp 150 according to this embodiment. The vehicle lamp 150 includes the lamp 10, the sensor 20, the reflecting mirror 30, and a transparent organic EL device 70. The respective parts are housed within a housing (not illustrated) and are integrated.

The transparent organic EL device 70 itself emits a light, and a front of the vehicle lamp 150 is irradiated with the light. Accordingly, in this embodiment, the whole transparent organic EL device 70 is the light irradiating region. Since the transparent organic EL device 70 is configured of a material that transmits a light, the incidence and emission of the light is not interfered between the lamp 10 and sensor 20 and the outside, thereby ensuring proper light irradiation and external environment measurement. This causes the sensor 20 to be visually perceived as the light emitting region from the outside even though the sensor 20 is the non-light-emitting element, thereby ensuring the improved designability. Downsizing and thinning of the vehicle lamp 150 can also be achieved.

The present invention is not limited to each of the above-described embodiments. Various kinds of changes are allowed within a scope of the claims, and embodiments obtained by appropriately combining each of the disclosed technical means with different embodiments are also included in the technical scope of the present invention.

This application claims priority from Japanese Patent Application No. 2017-101471 filed with the Japanese Patent Office on May 23, 2017, the entire contents of which are hereby incorporated by reference.

The above description of a specific embodiment of the present invention is disclosed as illustrative. This does not intend to be exhaustive or limit the present invention to the described embodiments as they are. Many modifications and variations will be apparent to one of ordinary skill in the art in light of the above teachings.

DESCRIPTION OF REFERENCE SIGNS

100, 110, 120, 130, 140, 150: Vehicle lamp
10: Lamp
20: Sensor
30: Reflecting mirror
31: Reflective plate
40a, 40b, 40c, 60: Organic EL device
40c, 70: Transparent organic EL device
41: LED
50: Light guiding member
50a, 52a, 52b: Scattering portion
50b: Transmit window portion
51a, 51b: Reflective plate
53a, 53b: Diffusion plate
61, 62: Opening

What is claimed is:

1. A vehicle lamp comprising:
a lamp function unit,
a sensor function unit, and
a second lamp function unit, wherein
the lamp function unit has a light irradiating region,
the sensor function unit is arranged within the light irradiating region in a front view, and the second lamp function unit is arranged within the light irradiating region in a front view.

2. The vehicle lamp according to claim 1, wherein
in front of the sensor function unit, a transmission window portion that transmits a light is disposed in the light irradiating region.

3. A vehicle lamp comprising:
a lamp function unit and a sensor function unit, wherein the lamp function unit has a light irradiating region,
the sensor function unit is arranged within the light irradiating region in a front view, and
the light irradiating region is configured of an organic EL device.

4. A vehicle lamp comprising:
a lamp function unit and a sensor function unit, wherein
the lamp function unit has a light irradiating region,
the sensor function unit is arranged within the light irradiating region in a front view, and
the light irradiating region is configured of a light source unit and a reflecting mirror that reflects a light from the light source unit.

5. The vehicle lamp according to claim 1, wherein
the light irradiating region is configured of a light source unit and a light guiding member, and a scattering portion that scatters a light from the light source unit is formed on the light guiding member.

* * * * *

UNITED STATES PATENT AND TRADEMARK OFFICE
CERTIFICATE OF CORRECTION

PATENT NO. : 10,823,354 B2  
APPLICATION NO. : 16/614004  
DATED : November 3, 2020  
INVENTOR(S) : Masaya Shido et al.

Page 1 of 1

It is certified that error appears in the above-identified patent and that said Letters Patent is hereby corrected as shown below:

In the Specification

Column 1, Line 56, "unit, herein the lamp" should read -- unit, wherein the lamp --

Column 9, Line 31, "to FIG. 1. Duplicate" should read -- to FIG. 7. Duplicate --

Signed and Sealed this  
Thirtieth Day of March, 2021

Drew Hirshfeld  
*Performing the Functions and Duties of the*  
*Under Secretary of Commerce for Intellectual Property and*  
*Director of the United States Patent and Trademark Office*